United States Patent

Kanagawa

[11] Patent Number: 6,111,564
[45] Date of Patent: Aug. 29, 2000

[54] COORDINATE INPUT DISPLAY APPARATUS AND METHOD FOR CONSTRUCTING THE SAME

[75] Inventor: Makoto Kanagawa, Nagoya, Japan

[73] Assignee: Sanyo Electric Co., Ltd., Moriguchi, Japan

[21] Appl. No.: 09/028,776

[22] Filed: Feb. 24, 1998

[30] Foreign Application Priority Data

Feb. 25, 1997 [JP] Japan .................................. 9-041076

[51] Int. Cl.$^7$ ...................................................... G09G 5/00
[52] U.S. Cl. ...................... 345/173; 345/178; 178/18.01; 178/18.03; 178/18.05; 178/18.06; 178/18.07; 178/18.1
[58] Field of Search ..................................... 345/173, 178, 345/92; 178/18.01, 18.03, 18.05, 18.06, 18.07, 18.1

[56] References Cited

U.S. PATENT DOCUMENTS

| | | | |
|---|---|---|---|
| 4,726,120 | 2/1988 | Levi | 33/1 M |
| 4,730,186 | 3/1988 | Koga et al. | 345/174 |
| 5,231,381 | 7/1993 | Duwaer | 345/174 |
| 5,541,372 | 7/1996 | Baller et al. | 178/18.01 |
| 5,771,039 | 6/1998 | Ditzik | 345/178 |
| 5,867,151 | 2/1999 | Nakai | 345/173 |

*Primary Examiner*—William A. Cuchlinski, Jr.
*Assistant Examiner*—Marthe Y. Marc-Coleman
*Attorney, Agent, or Firm*—Armstrong, Westerman, Hattori, McLeland & Naughton

[57] ABSTRACT

A coordinate input display apparatus includes an input pad, such as a digitizer, disposed over a display unit, such as an LCD. In order to provide an improved visual display, a distance between the digitizer and the LCD is minimized, as is the thickness of the digitizer, while at the same time, preventing the digitizer from contacting the LCD when the digitizer is subjected to a maximum normal load.

15 Claims, 2 Drawing Sheets

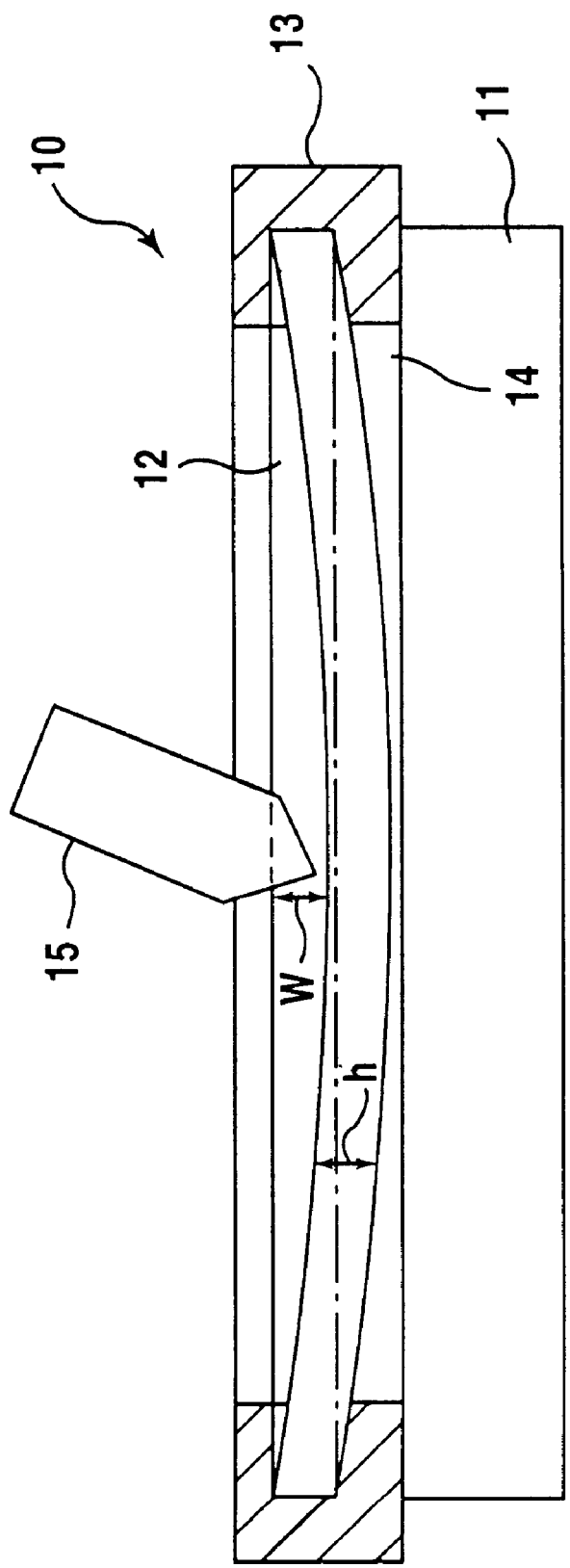

COORDINATE INPUT DISPLAY APPARATUS AND METHOD FOR CONSTRUCTING THE SAME

BACKGROUND OF THE INVENTION

The present invention relates to a display apparatus, and more particularly, to a coordinate input display apparatus which includes a transparent digitizer.

A coordinate input display apparatus equipped with a liquid crystal display (LCD) as a display unit and a digitizer (tablet) as a coordinate input device have been developed in which the input device is provided in a single body on the LCD.

FIG. 1 schematically shows a conventional coordinate input display apparatus. A transparent digitizer 21 is disposed, with a predetermined clearance 23, over a display unit 22, such as an LCD or the like. The digitizer 21 is a resistance film sensitive type. Coordinates are input by depressing the digitizer 21 with a coordinate input pen 24 or an operator's finger.

A read controller 25 connected to the digitizer 21 reads the input coordinates and sends the coordinate data to a main system 26. The main system 26 processes the coordinate data and generates display data to be displayed on the display unit 22 as needed. A display controller 27 performs display control on the display unit 22 based on the display data from the main system 26. When a line L1 is input on the digitizer 21 by, for example, the coordinate input pen 24, the read controller 25 reads the coordinates of multiple points of the line L1. The main system 26 generates display data based on the read coordinate data. Based on the display data, the display controller 27 displays a line L2 corresponding to the line L1 on the display unit 22.

The digitizer 21 is moved or bent by the depression load of the coordinate input pen 24. When the amount of bending of the digitizer 21 is too large, the bottom of the digitizer 21 contacts the display unit 22. In this case, the depression load acting on the digitizer 21 is transmitted to the display surface of the display unit 22 and may adversely affect image display on the display unit 22.

When the display unit 22 is an LCD, particularly, contacting the display surface causes critical display disturbance called an interference fringe. For this reason, the clearance 23 is generally provided so that the digitizer 21, even when bent, does not contact the surface of the LCD. To reduce the bending amount of the digitizer 21, the thickness of the digitizer 21 is set large.

Making the digitizer 21 thicker or setting the large clearance 23 between the digitizer 21 and the display unit 22 increases the parallax, making pen inputs or finger-touching inputs difficult. The parallax is a distance between the surface on which a user actually makes inputs with the pen 24 and the surface where dots corresponding to the inputs are displayed. When the user obliquely observing the input surface designates a specific position on the input surface with the pen 24, an image corresponding to that input is displayed on the display surface directly below the designated position. When the user the designated position, however, the image is not displayed on the display surface on an extending line which connects the user's eyes to the designated position. The user therefore notices some deviation between the input position and the display position. That is, the coincidence between the input position and the display position is impaired.

It is necessary to satisfy the competing, contradictory requirements of increasing the thickness of the digitizer 21 or the clearance 23 between the digitizer 21 and the display unit 22 and of decreasing those values in view of their influence on the parallax, In the conventional coordinate input display apparatus, the thickness of the digitizer 21 and the clearance 23 between the digitizer 21 and the display unit 22 are determined empirically. However, the empirical determination lacks preciseness and does not necessarily provide optimal values.

Accordingly, it is an object of the present invention to provide a coordinate input display apparatus optimal values of the thickness of a digitizer and a clearance between the digitizer and a display unit.

SUMMARY OF THE INVENTION

To achieve the above objective, the present invention further provides a coordinate input display apparatus for displaying a position corresponding to a depressed position, comprising: a display unit; and a transparent digitizer provided over the display unit with a clearance and having predetermined physical properties, including Young's modulus, length and width, the digitizer being bendable toward the display unit in accordance with a level of a depression load applied thereon, wherein the clearance between the digitizer and the display unit and a thickness of the digitizer are set such that when a maximum normal depression load is applied to the digitizer, a contact between the digitizer and the display unit is sufficiently avoided, and when no load is applied to the digitizer, a parallax produced by a distance between the digitizer and the display unit is minimized.

The present invention provides a coordinate input display apparatus for displaying a position corresponding to a depressed position, comprising: a display unit; and a transparent digitizer provided over the display unit with a clearance and having a predetermined shape, the digitizer being bendable toward the display unit in accordance with a level of a depression load applied to itself, a bending amount of the digitizer being maximum when a maximum normal depression load; wherein the clearance between the digitizer and the display unit is set equal to or greater by a predetermined range than a maximum bending amount of the digitizer.

The present invention provides a method of constructing a coordinate input display apparatus, which comprises: disposing a transparent input pad over a display unit, wherein a thickness (h) of the input pad is set to a minimum thickness such that when the input pad is subjected to a maximum, predetermined normal force, the input pad does not contact the display unit; determining an optimal distance (d) between the display unit and the input pad such that when the input pad is subjected to the maximum, predetermined normal force, the input pad does not contact the display unit; and securing the input pad over the display unit at said determined optimal distance such that a parallax produced by spacing the input pad and the display unit from each other is substantially minimized.

The present invention further provides a method of constructing a coordinate input display apparatus, which comprises: disposing a transparent digitizer over an LCD display unit, wherein a thickness (h) of the digitizer is set to a minimum thickness such that when the digitizer is subjected to a maximum, predetermined normal force, the digitizer does not contact the LCD display unit; determining an optimal distance (d) between the LCD display unit and the digitizer such that when the digitizer is subjected to the maximum, predetermined normal force, the digitizer does not contact the LCD display unit; and securing the digitizer over the LCD display unit at said determined optimal distance such that a parallax produced by spacing the digitizer and the LCD display unit from each other is substantially minimized.

The present invention provides a method of constructing a coordinate input display apparatus, which comprises: disposing a transparent digitizer over an LCD display unit, wherein a thickness (h) of the digitizer is set to a minimum thickness such that when the digitizer is subjected to a maximum, predetermined normal force, the digitizer does not contact the LCD display unit; determining an optimal distance (d) between the LCD display unit and the digitizer such that when the digitizer is subjected to the maximum, predetermined normal force, the digitizer does not contact the LCD display unit; and securing the digitizer over the LCD display unit at said determined optimal distance such that a parallax produced by spacing the digitizer and the LCD display unit from each other is substantially minimized, wherein the thickness (h) of the digitizer is determined by: $d=(3 \cdot \alpha \cdot P \cdot a^2)/(E \cdot h^3)$ where $\alpha=0.061+0.019(C-1)^{0.4}$, P is the maximum, predetermined normal force, a is a width of the digitizer, C is a ratio of the width of the digitizer to the length of the digitizer, and E is Young's modulus, and the distance (d) is determined by: $d=3/h$.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 2 is a cross-sectional view showing a coordinate input display apparatus according to the present invention.

DETAILED DESCRIPTION OF THE PREFERRED EMBODIMENT

Figure 1:
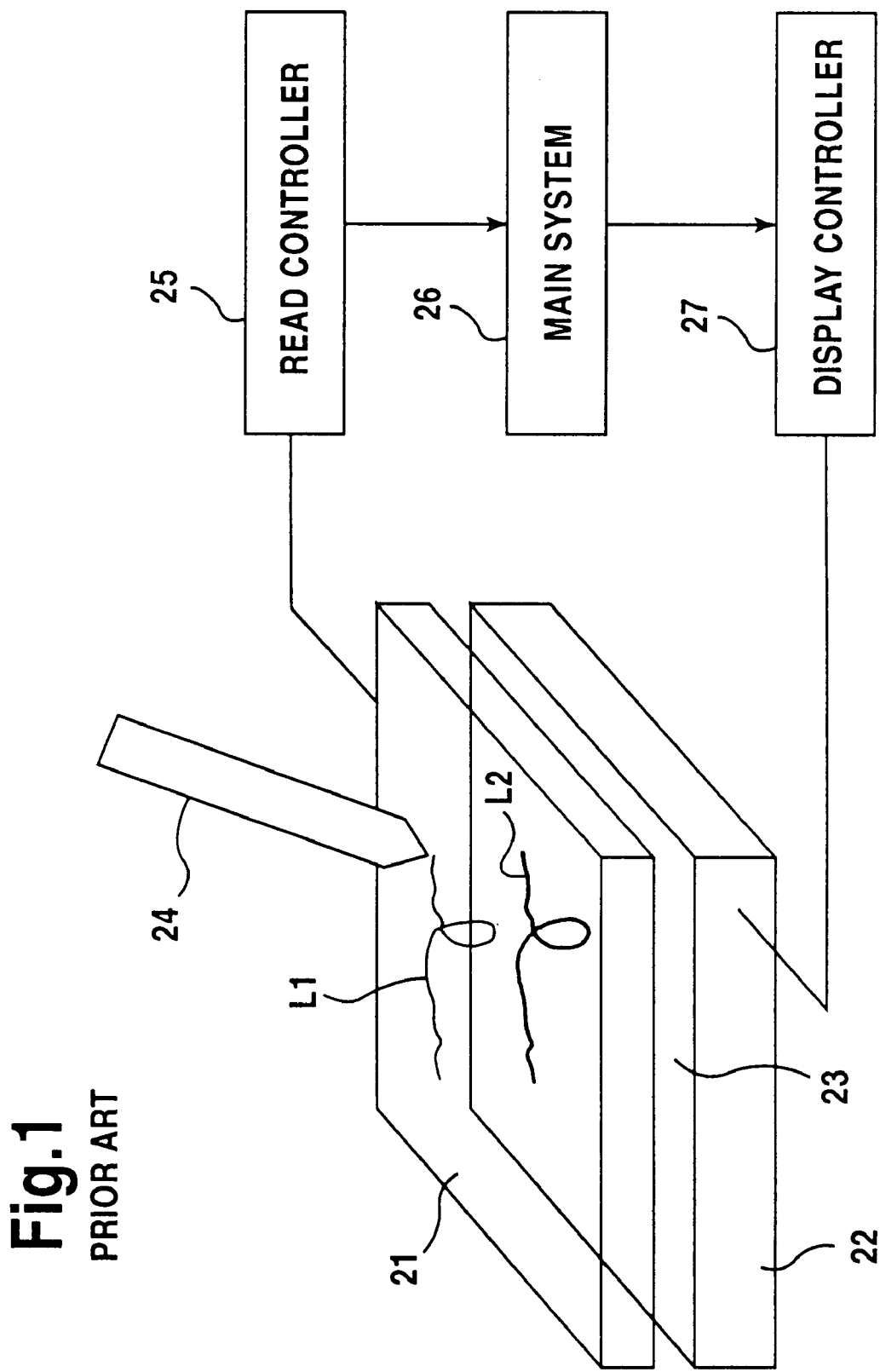
FIG. 1 is a schematic diagram illustrating an ordinary conventional coordinate input display apparatus.

An embodiment in accordance with the present invention will now be described with reference to FIGS. 1 and 2.

A coordinate input display apparatus 10 comprises a display unit 11 and a transparent digitizer 12. Like the conventional display apparatus, the coordinate input display apparatus 10 further comprises a read controller 25, a main system 26 and a display controller 27, as shown in FIG. 1 whose description will not be repeated. The display 11 preferably comprises an LCD. As previously discussed, a display of the display unit 11 is adversely affected by force acting on the display surface, deformation of the display surface or the like.

The digitizer 12 is secured to the display unit 11 by a casing 13 holding its peripheral portion. The display unit 11 is spaced from the digitizer 12 by a predetermined clearance 14. The digitizer 12 preferably uses a coordinate detection system such as a resistance film sensitive type, a capacitive coupling type, an optical type or an ultrasonic type. Coordinates are input by depressing the surface of the digitizer 12 with an input device 15, such as a coordinate input pen or an operator's finger.

The thickness of the digitizer 12 and the clearance 14 between the digitizer 12 and the display unit 11 are set in such a manner that the digitizer 12 does not contact the display unit 11 even when the maximum load possible in the normal inputting of coordinates acts on the digitizer 12. The maximum load is the largest possible load in the normal use of the coordinate input display apparatus 10, and is generally specified in a catalog, a product specification or the like. In normal usage, the general stroke pressure is about 40 to about 200 gram-weight (gf). In this embodiment, the maximum load is set to, for example, 1 Kg-weight (kgf) in order to provide for a load with a sufficiently large margin. When a load of a predetermined value, e.g., 20 to 100 gf, or greater acts on the digitizer 12, an input on the digitizer 12 is read by the read controller 15.

The thickness of the digitizer 12 and the clearance 14 between the digitizer 12 and the display unit 11 are precisely determined and set, as described below.

The amount of bending of the digitizer 12 is considered as the amount of bending of a thin flat plate. With the periphery of the digitizer secured, as shown in FIG. 2, the maximum bending amount occurs at a center thereof. The maximum bending amount w may be determined approximately by an equation (1) below.

$$w=(\alpha \cdot P \cdot a^2)/(E \cdot h^3) \tag{1}$$

$$\alpha=0.061+0.019(C-1)^{0.4}$$

where a: the width of the flat plate,

C: the length of the flat plate/the width of the flat plate, h: the thickness of the flat plate, E: Young's modulus, and P: maximum load acting on the flat plate.

When the clearance 14 between the digitizer 12 and the display unit 11 is set to the maxirnum bending amount w given by the equation (1), the parallax is given by the sum of the thickness h of the flat plate (digitizer 12) and the clearance 14 (i.e., the maximum bending amount w). In other words, the parallax is expressed by the following equation (2).

$$h+w=h+(\alpha \cdot P \cdot a^2)/(E \cdot h^3) \tag{2}$$

If the individual parameters α, P, a and E are previously determined, expressing $(\alpha \cdot P \cdot a^2)/E$ as a constant A allows the equation (2) to be rewritten as follows:

$$h+w=h+A \cdot h^{-3} \tag{3}$$

Differentiating the equation (3) with respect to "h" yields an equation (4).

$$d(h+w)/dh=1+(-3)A \cdot h^{-4} \tag{4}$$

When the value of the equation (4) is 0, the thickness h has a minimum value.

$$d(h+w)/dh=1+(-3)A \cdot h^{-4}=0$$

$$1=3 \cdot A \cdot h^{-4}$$

$$h^{-4}=1(3 \cdot A)$$

$$h^4 3 \cdot A$$

$$\Delta h=(3 \cdot A)^{1/4}=\{3(\alpha \cdot P \cdot a^2)/E\}^{1/4} \tag{5}$$

From the equation (1), the maximum bending amount w then is $$w=h/3 \tag{6}.$$

With the maximum depression load P given, therefore, the thickness h of the digitizer 12 is designed based on the equation (5), and the clearance w between the digitizer 12 and the display unit 11 is designed based on the equation (6). That is, the clearance w is set to one third of the thickness h of the digitizer 12. This design prevents the digitizer 12 from contacting the surface of the display unit 11 and minimizes the parallax even when the digitizer 12 is bent by the maximum load P.

When each parameter is given, for example, the maximum load P=1 kgf, or 9.8 N, the width of the digitizer a=0.19 m, the length to width ratio of the digitizer C=1.21 and Young's modulus E=7.5×10$^{10}$ N/m$^2$, the thickness of the digitizer is computed as h=1.00 mm according to the equation (5). Then, the clearance 14 is computed as 0.333 mm according to the equation (6).

On the other hand, when each parameter P, a, C and E is given as in the above case with the thickness of the digitizer given as h=1.4 mm, the clearance 14 is computed as 0.122 mm according to the equation (1).

According to the present invention, the thickness h of the digitizer 12 and the value of the clearance w which minimize the parallax are computed using the equations (5) and (6). This eliminates the need for empirical knowledge of those skilled in the art or going through trial and error in experiments, and thus significantly reduces the development cost of the coordinate input display apparatus 10.

When in addition to the maximum value P of the depression load which is applied to the digitizer 12, the thickness h of the digitizer 12 has already been determined, the amount of the maximum bending w originated from the maximum load P is computed according to the equation (1). Then, the maximum bending amount w is set to the value of the clearance 14 between the digitizer 12 and the display unit 11.

It is the best to apply the computed thickness h and clearance w to actual apparatus. However, the actual thickness of the digitizer 12 or the actual clearance 14 should not necessarily be coincident with the computed value h or w, or the parallax may be increased to the level that does not provide users with an apparent awkward feeling. The thickness of the digitizer 12 may be increased by, for example, 0 to 20% with respect to the computed value h. The value of the clearance 14 may be increased by, for example, 0 to 20% with respect to the computed value w. Accordingly, the value of the parallax may also be increased by, for example, 0 to 20% with respect to the computed value (h+w). such an increase in parallax does not give users as awkward feeling when using the apparatus. This increased parallax permits a large margin which prevents the digitizer 12 from contacting the display unit 11 when bent. Even if a load greater than the estimated maximum load P should be applied to the digitizer 12 a contact between the digitizer 12 and the display unit 11 will be avoided.

Although the periphery of the digitizer 12 is held and secured by the casing 13 in this embodiment, the design may be modified in such a manner that the periphery or the digitizer 12 is simply supported or mounted on the casing. Even in this case, the values of the thickness h of the digitizer 12 and the clearance w are so determined as to minimize the parallax. The maximum bending amount w of the digitizer 12 is also given by the aforementioned equation (1) in this case. It is to be noted however that $\alpha=0.137 C^{0.346}$. The reason why the equation of alpha differs from the aforementioned one is because the equation for computing the bending amount of the digitizer 12 differs in accordance with the structure that supports the digitizer 12.

Therefore, the present examples and embodiment are to be considered as illustrative and not restrictive and the invention is not to be limited to the details given herein, but may be modified within the scope and equivalence of the appended claims.

What is claimed is:

1. A coordinate input display, for displaying a position corresponding to a depressed position, comprising:

a display unit; and a transparent digitizer provided over the display unit with a clearance and having predetermined physical properties, including Young's modulus, length and width, the digitizer being bendable toward the display unit in accordance with a level of a depression load applied thereon, wherein the clearance between the digitizer and the display unit and a thickness of the digitizer are set such that when a maximum normal depression load is applied to the digitizer, a contact between the digitizer and the display unit is sufficiently avoided, and when no load is applied to he digitizer, a parallax produced by a distance between the digitizer and the display unit is minimized, p1 wherein the digitizer has a rectangular shape having four sides, the apparatus further comprising a casing for holding and securing the four sides of the digitizer, wherein the thickness of the digitizer is set within a range of up to a 20% increase of a computed value h in accordance with a first equation;

wherein the clearance between the digitizer and the display unit is set within a range of up to a 20% increase of a computed value d in accordance with a second equation; and wherein the first and second equations for setting the thickness of the digitizer and the clearance between the digitizer and the display unit are given by $$h=\{(3\cdot\alpha\cdot P\cdot a^2)/E\}^{1/4},$$

and $$d=3/h,$$

where $\alpha=0.061+0.019(C-1)^{0.4}$, P is the maximum depression load to be applied to the digitizer, a is a width of the digitizer, C is a ratio of a length of the digitizer to the width thereof, and E is the Young's modulus.

2. The coordinate input display apparatus according to claim 1, wherein the thickness of the digitizer is set to the computed value h.

3. The coordinate input display apparatus according to claim 1, wherein the clearance between the digitizer and the display unit is set to the computed value d.

4. A coordinate input display apparatus for displaying a position corresponding to a depressed position, comprising:

a display unit; and a transparent digitizer provided over the display unit with a clearance and having predetermined physical properties, including Young's modulus, length and width, the digitizer being bendable toward the display unit in accordance with a level of a depression load applied thereon, wherein the clearance between the digitizer and the display unit and a thickness of the digitizer are set such that when a maximum normal depression load is applied to the digitizer, a contact between the digitizer and the display unit is sufficiently avoided, and when no load is applied to he digitizer, a parallax produced by a distance between the digitizer and the display unit is minimized, wherein the digitizer has a rectangular shape having four sides, the apparatus further comprising a casing for supporting the four sides of the digitizer thereon, wherein the thickness of the digitizer is set within a range of up to 20% increase of a computed value h in accordance with a first equation;

wherein the clearance between the digitizer and the display unit is set within a range of up to a 20% increase of a computed value d in accordance with a second equation; and wherein the first and second equations for setting the thickness of the digitizer and the clearance between the digitizer and the display unit are given by $$h = \{(3 \cdot \alpha \cdot P \cdot a^2)/E\}^{1/4},$$

and $$d = 3/h,$$

where $\alpha = 0.137(C-1)^{0.346}$, p is the maximum depression load to be applied to the digitizer, a is a width of the digitizer, C is a ratio of a length of the digitizer to the width thereof, and E is the Young's modulus.

5. The coordinate input display apparatus according to claim 4, wherein the thickness of the digitizer is set to the computed value h.

6. The coordinate input display apparatus according to claim 4, wherein the clearance between the digitizer and the display unit is set to the computed value d.

7. A coordinate input display apparatus for displaying a position corresponding to a depressed position, comprising:

a display unit; and a transparent digitizer provided over the display unit with a clearance and having a predetermined shape, the digitizer being bendable toward the display unit in accordance with a level of a depression load applied to itself, a bending amount of the digitizer being maximum when a maximum normal depression load;

wherein the clearance between the digitizer and the display unit is set equal to or greater by a predetermined range than a maximum bending amount of the digitizer such that the transparent digitizer does not contact the display unit, wherein the digitizer has a rectangular shape having four sides, the apparatus further comprising a casing for holding and securing the four sides of the digitizer;

wherein the clearance between the digitizer and the display unit is set within a range of up to a 20% increase of a computed value d in accordance with an equation; and wherein an equation for setting the clearance between the digitizer and the display unit is given by $$d = (3 \cdot \alpha \cdot P \cdot a^2)/(E \cdot h^3)$$

where $\alpha = 0.061 + 0.019(C-1)^{0.4}$, P is the maximum depression load to be applied to the digitizer, a is a width of the digitizer, C is a ratio of a length of the digitizer to the width thereof, and E is the Young's modulus.

8. The coordinate input display apparatus according to claim 7, wherein the clearance between the digitizer and the display unit is set to the computed value d.

9. A method of constructing a coordinate input display apparatus which comprises:

disposing a transparent input pad over a display unit, wherein a thickness (h) of the input pad is set to a minimum thickness such that when the input pad is subjected to a maximum, predetermined normal force, the input pad does not contact the display unit;

determining an optimal distance (d) between the display unit and the input pad such that when the input pad is subjected to the maximum, predetermined normal force, the input pad does not contact the display unit; and securing the input pad over the display unit at said predetermined optimal distance such that a parallax produced by spacing the input pad and the display unit from each other is substantially minimized, wherein the thickness (h) of the input pad is determined by: $h = \{(3 \cdot \alpha \cdot P \cdot a^2)/E\}^{1/4}$, wherein $\alpha = 0.061 + 0.019(C-1)^{0.4}$, P is the maximum, predetermined normal force, a is a width of the input pad, C is a ratio of the width of the input pad to the length of the input pad, and E is the Young's modulus.

10. The method of constructing a coordinate input display apparatus according to claim 9, wherein the distance (d) is determined by: $d = 3/h$.

11. The method of constructing a coordinate input display apparatus according to claim 10, wherein the thickness (h) is within a range of up to about 20% more than its computed value.

12. The method of constructing a coordinate input display apparatus according to claim 10, wherein the distance (d) is within a range of up to about 20% more than its computed value.

13. A method of constructing a coordinate input display apparatus, which comprises:

disposing a transparent digitizer over an LCD display unit, wherein a thickness (h) of the digitizer is set to a minimum thickness such that when the digitizer is subjected to a maximum, predetermined normal force, the digitizer does not contact the LCD display unit;

determining an optimal distance (d) between the LCD display unit and the digitizer such that when the digitizer is subjected to the maximum, predetermined normal force, the digitizer does not contact the LCD display unit, and securing the digitizer over the LCD display unit at said determined optimal distance such that a parallax produced by spacing the digitizer and the LCD display unit form each other is subsequently minimized, wherein the thickness (h) of the digitizer is determined by: $h = \{(3 \cdot \alpha \cdot P \cdot a^2)/E\}^{1/4}$, wherein $\alpha = 0.061 + 0.019(C-1)^{0.4}$, P is the maximum, predetermined normal force, a is a width of the digitizer, C is a ratio of the width of the digitizer to the length of the digitizer, and E is the Young's modulus.

14. The method of constructing a coordinate input display apparatus according to claim 13, wherein the distance (d) is determined by: d=3/h.

15. A method of constructing a coordinate input display apparatus, which comprises:

disposing a transparent digitizer over an LCD display unit, wherein a thickness (h) of the digitizer is set to a minimum thickness such that when the digitizer is subjected to a maximum, predetermined normal force, the digitizer does not contact the LCD display unit;

determining an optimal distance (d) between the LCD display unit and the digitizer such that when the digitizer is subjected to the maximum, predetermined normal force, the digitizer does not contact the LCD display unit; and securing the digitizer over the LCD display unit at said determined optimal distance such that a parallax produced by spacing the digitizer and the LCD display unit from each other is substantially minimized, wherein the thickness (h) of the digitizer is determined by: $h=\{3 \cdot \alpha \cdot P \cdot a^2)/E\}^{1/4}$, wherein $\alpha=0.061+0.019(C-1)^{0.4}$, P is the maximum, predetermined normal force, a is a width of the digitizer, C is a ratio of the width of the digitizer to the length of the digitizer, and E is Young's modulus, and the distance (d) is determined by: d=3/h.

* * * * *